(12) United States Patent
Tan et al.

(10) Patent No.: US 9,279,611 B2
(45) Date of Patent: Mar. 8, 2016

(54) INTELLIGENT REFRIGERATOR BASED ON INTERNET OF THINGS AND APPLICATION SYSTEM THEREOF

(71) Applicant: SHENZHEN K&D TECHNOLOGY CO., LTD., Guangdong (CN)

(72) Inventors: Xueliang Tan, Guangdong (CN); Bendy Husin, Guangdong (CN); Mulan Ou, Guangdong (CN)

(*) Notice: Subject to any disclaimer, the term of this patent is extended or adjusted under 35 U.S.C. 154(b) by 0 days.

(21) Appl. No.: 14/410,064

(22) PCT Filed: Jan. 31, 2013

(86) PCT No.: PCT/CN2013/071166
§ 371 (c)(1),
(2) Date: Dec. 20, 2014

(87) PCT Pub. No.: WO2013/189183
PCT Pub. Date: Dec. 27, 2013

(65) Prior Publication Data
US 2015/0323245 A1    Nov. 12, 2015

(30) Foreign Application Priority Data

Jun. 21, 2012 (CN) .......................... 2012 1 0207358

(51) Int. Cl.
| | | |
|---|---|---|
| *G06F 7/00* | (2006.01) | |
| *F25D 29/00* | (2006.01) | |
| *G05B 15/02* | (2006.01) | |
| *H04W 4/00* | (2009.01) | |
| *H04L 29/08* | (2006.01) | |
| *H04L 12/28* | (2006.01) | |
| *G06F 3/0488* | (2013.01) | |

(52) U.S. Cl.
CPC ................ *F25D 29/00* (2013.01); *G05B 15/02* (2013.01); *G06F 3/0488* (2013.01); *H04L 12/282* (2013.01); *H04L 12/2834* (2013.01); *H04L 67/12* (2013.01); *H04W 4/005* (2013.01); *H04W 4/008* (2013.01); *F25D 2400/361* (2013.01); *H04L 2012/285* (2013.01)

(58) Field of Classification Search
None
See application file for complete search history.

(56) References Cited

U.S. PATENT DOCUMENTS

| | | | | |
|---|---|---|---|---|
| 2008/0184719 | A1* | 8/2008 | Lowenstein ............ | F25D 29/00 62/127 |
| 2014/0304126 | A1* | 10/2014 | Kim ...................... | G06Q 10/087 705/28 |
| 2014/0355588 | A1* | 12/2014 | Cho ..................... | H04L 12/2816 370/338 |
| 2015/0161909 | A1* | 6/2015 | Won ..................... | G06F 19/3475 434/127 |

* cited by examiner

*Primary Examiner* — Yolanda Cumbess
(74) *Attorney, Agent, or Firm* — Prakash Nama; Global IP Services, PLLC

(57) ABSTRACT

An intelligent refrigerator based on the Internet of Things and an application system thereof, relating to the technical field of the Internet of Things, and in particular, to the aspect of intelligent refrigerator system module improvement based on the Internet of Things. The intelligent refrigerator comprises a refrigerator main body and a refrigerator control module which is arranged in the refrigerator main body and used for controlling the operation of the refrigerator main body. The refrigerator main body also comprises a central processing system module, the refrigerator control module being in communication connection with the central processing system module through a UART interface. A touch display module for man-machine interaction, and a network communication module for connecting the Internet network are also connected to the central processing system module. The intelligent refrigerator can realize managing the storage information of foods in a refrigerator in a graphical manner.

5 Claims, 5 Drawing Sheets

INTELLIGENT REFRIGERATOR BASED ON INTERNET OF THINGS AND APPLICATION SYSTEM THEREOF

BACKGROUND OF THE INVENTION

The present invention relates to the technical field of Internet of things, and in particular, to an aspect of an intelligent refrigerator structural improvement based on Internet of things.

As people's living standard develops rapidly, refrigerators play a more important role in homes. Refrigerators have become a household necessity. The capacity and food storage capability of a refrigerator have been improved dramatically. While making life convenient, the large capacity of a refrigerator also causes some trouble because people are often not clear about whether food is used up or forget some food in the refrigerator.

A refrigerator in which food is identified by using a radio frequency identification (RFID) technology has emerged. Before food is put into the refrigerator, an RFID tag is read, and the food is managed according to an RFID identification code.

However, at present, RFID tags are not used on commodities sold in supermarkets; therefore, it is a tedious process to tag all food, and moreover, tags may cost more money than food, which is the problem that impedes practical use of an RFID intelligent refrigerator.

BRIEF SUMMARY OF THE INVENTION

In conclusion, an objective of the present invention is to provide an intelligent refrigerator based on Internet of things and an application system thereof, so as to solve a deficiency in food storage management of an existing refrigerator and technical problems of tediousness and high costs in using an RFID technology.

In order to solve the technical problems raised in the present invention, the following technical solution is used: an intelligent refrigerator based on Internet of things includes a refrigerator body and a refrigerator control module that is disposed in the refrigerator body and configured to perform operational control on the refrigerator body, where the refrigerator body further includes a central processing system module, and the refrigerator control module is in communication connection with the central processing system module through a universal asynchronous receiver/transmitter (UART) interface; and the central processing system module is further connected to a touch display module used for human-computer interaction and a network communications module used for connection to the Internet; and the central processing system module includes:

a food storage management unit, which includes virtual food storage areas corresponding to all food storage areas of the refrigerator body and a virtual food database, where, when food is stored in the refrigerator body, corresponding virtual food in the virtual food database is manually moved to a corresponding virtual food storage area by using the touch display module; and when stored food is taken out from the refrigerator body, corresponding virtual food is manually removed from the virtual food storage area by using the touch display module;

a query and order unit, configured to receive an operation instruction from the touch display module or a remote client, query storage information about virtual food in the virtual food storage area, and determine, according to the storage information obtained by means of querying, whether it is necessary to log onto a supermarket shopping network platform to place an order so as to supplement food; and a food monitoring unit, configured to provide an automatic prompt about the amount or a quality guarantee period of the virtual food put in the virtual food storage area.

The central processing system module uses an ARM core processor and an android 4.0 operating system.

The network communications module is a wireless fidelity (WIFI) module, an Ethernet module, or a general packet radio service (GPRS) communications module.

An intelligent refrigerator application system based on Internet of things includes the foregoing intelligent refrigerator, a remote client connected to the intelligent refrigerator through the Internet, and a supermarket shopping network platform for online shopping, where the intelligent refrigerator is configured to store food by freezing or cooling the food, and log onto the supermarket shopping network platform by using a network communications module that connects to the supermarket shopping network platform, so as to place an order to supplement food;

the remote client is connected to a central processing system module of the intelligent refrigerator through the Internet, queries the state and amount of the frozen and cooled food in the intelligent refrigerator, and logs onto the supermarket shopping network platform to place an order so as to supplement food; and the supermarket shopping network platform provides a purchase platform for the intelligent refrigerator or the remote client and provides purchase orders for businesses.

The remote client is a mobile phone, a computer, or a tablet computer.

The present invention has the following beneficial effect: the intelligent refrigerator of the present invention uses a touch display module which combines a capacitive touch panel technology and a thin film transistor (TFT) true-color display technology, gives full play to advantages of an android 4.0 operating system, and uses a visual graphical management method, so that food put into the intelligent refrigerator can be visually displayed as graphics on a display screen; this manner is easy to operate and does not increase costs as compared with an RFID operation manner.

When food is stored into a refrigerator body, virtual food is manually moved to a corresponding virtual food storage area by using a touch display module, where the virtual food storage area is corresponding to a storage location in the refrigerator body, so that people can learn a storage location of the food in a visual manner, and moreover, information such as a storage amount or a quality guarantee period of the food can be recorded; when stored food is taken out from the refrigerator body, corresponding virtual food is manually removed from a virtual food storage area by using the touch display module; and a prompt is provided when the amount decreases to a preset value or when a quality guarantee period is close to a maximum value. Moreover, a query may be performed by using a network terminal capable of connecting to the Internet, for example, a mobile phone or a computer, and the intelligent refrigerator can further access a supermarket network through the Internet, thereby achieving intelligent services of remote query and remote ordering.

DETAILED DESCRIPTION OF THE INVENTION

The content of the present invention is further described below with reference to the accompanying drawings and exemplary embodiments of the present invention.

Figure 1:
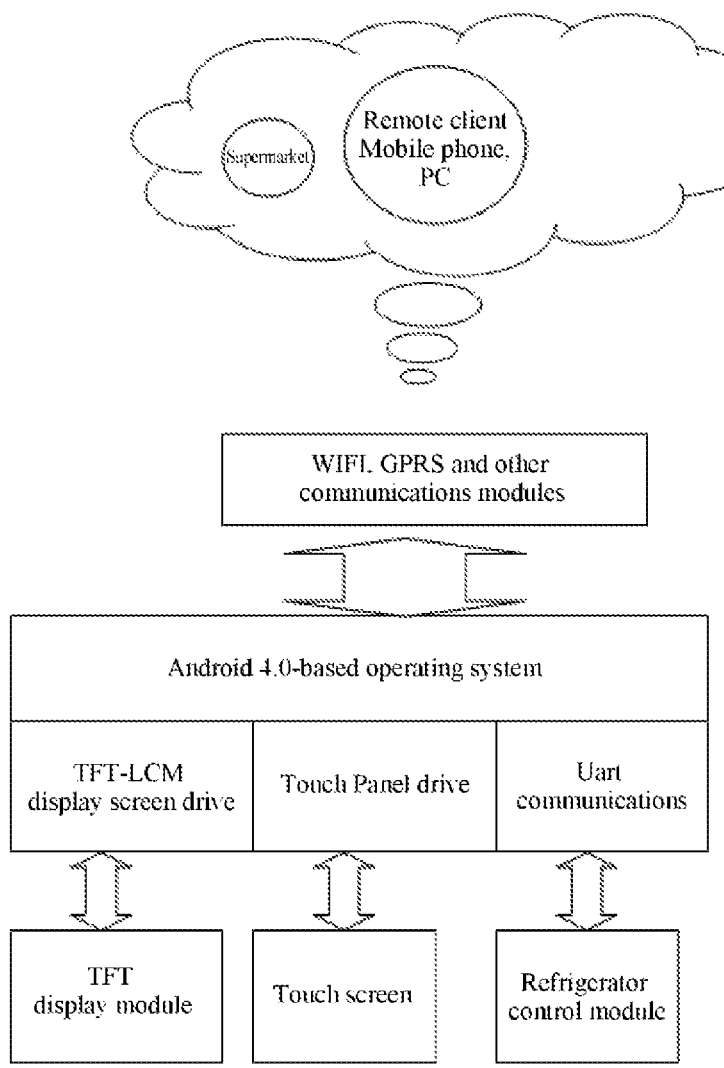
FIG. 1 is a schematic structural diagram of an intelligent refrigerator based on Internet of things of the present invention.

Referring to FIG. 1, the intelligent refrigerator based on Internet of things of the present invention includes a refrigerator body and a refrigerator control module that is disposed in the refrigerator body and configured to perform operational control on the refrigerator body. Besides, the refrigerator body further includes a central processing system module, and the refrigerator control module is in communication connection the central processing system module through a UART interface; and the central processing system module is further connected to a touch display module used for human-computer interaction and a network communications module used for connection to the Internet.

Figure 5:
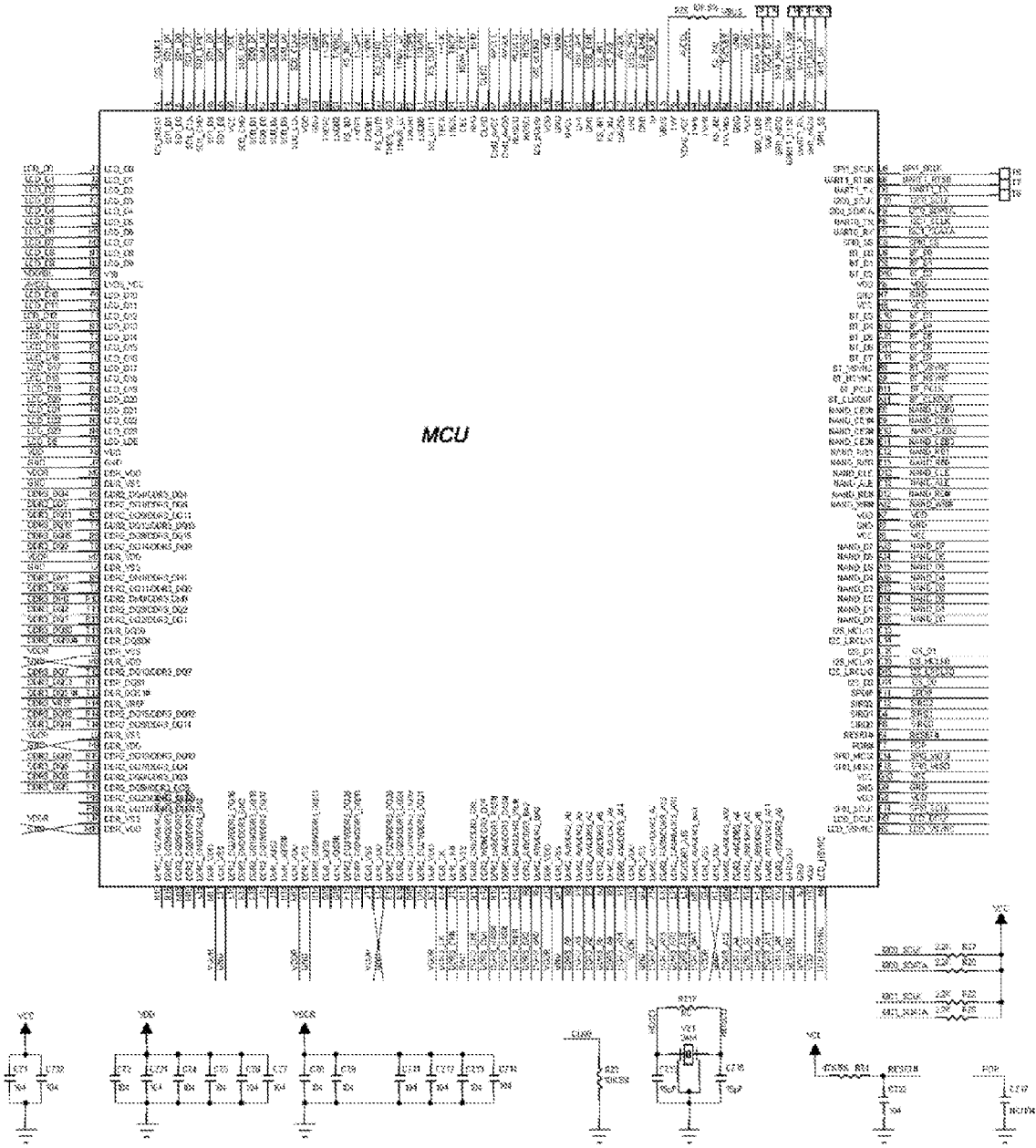
FIG. 5 is a schematic circuit diagram of a central processing system module of the present invention.

Referring to FIG. 5, a main control chip, namely, a microcontroller unit (MCU), of the central processing system module is a core part of the this system, and the main control chip uses an ARM core processor, runs an android 4.0 operating system, supports functions such as video, music, picture, sound recording, camera shooting and WIFI, and can combine remote communications, a multimedia application, and wireless communications together, to implement functions of intelligent refrigerator control and intelligent food management. The central processing system module includes a food storage management unit, a query and order unit, and a food monitoring unit.

Figure 2:
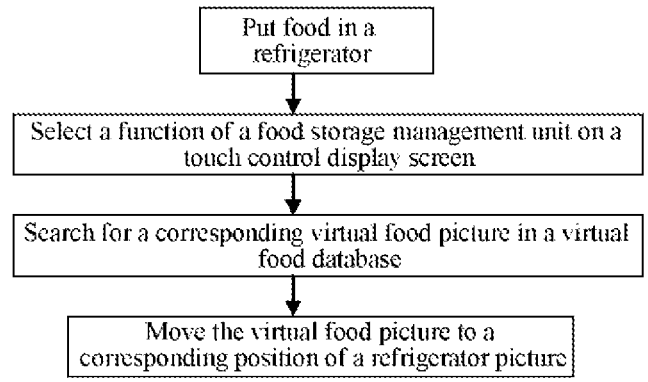
FIG. 2 is an operation flow chart of storing food in a refrigerator body.

The food storage management unit includes virtual food storage areas corresponding to all food storage areas of the refrigerator body and a virtual food database. Referring to FIG. 2, before storing food in the refrigerator body or after storing food in the refrigerator body, a user chooses to start the food storage management unit by using the touch display module, and manually move corresponding virtual food in a virtual food database to a corresponding virtual food storage area by using a touch display screen; and when stored food is taken out from the refrigerator body, corresponding virtual food is manually removed from a virtual food storage area by using the touch display module. Virtual food is displayed in a form of a physical picture, so that the user performs an operation in a more direct manner. A corresponding quality guarantee period parameter is set for each virtual food, and a corresponding volume parameter may also be set when it is necessary.

Figure 3:
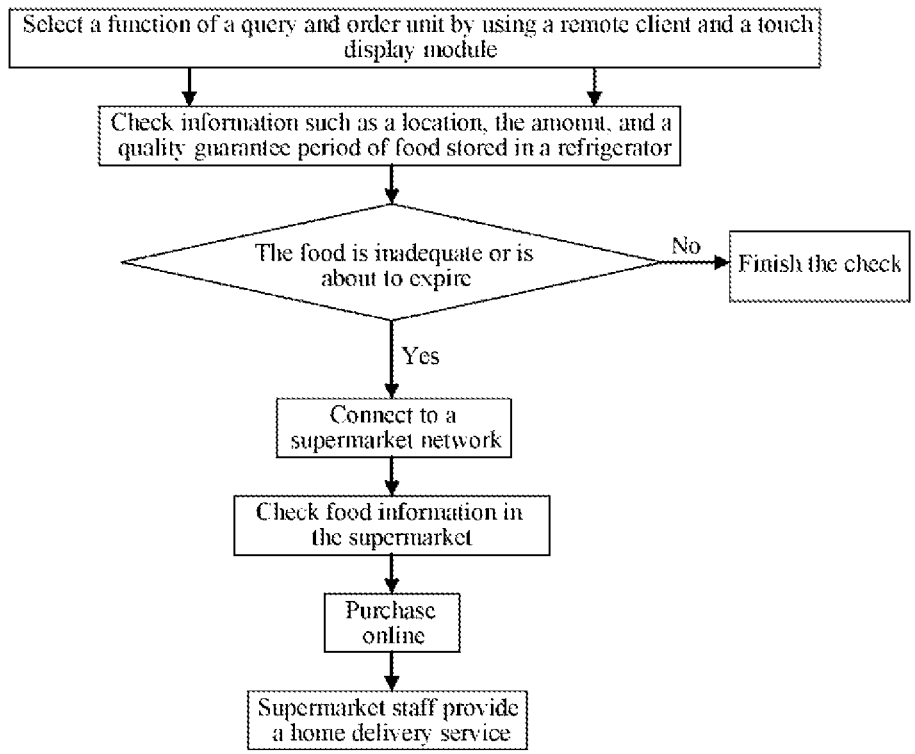
FIG. 3 is an operation flow chart of querying and food ordering.

Referring to FIG. 3, the query and order unit is configured to receive an operation instruction from the touch display module or the remote client, and query storage information about virtual food in a virtual food storage area. Storage information about food in the refrigerator body can be learned by querying the storage information about virtual food. By using the touch display module, the amount of food stored in the refrigerator body and time left before the expiration of the quality guarantee period of the food in the refrigerator body may be clearly learned locally without opening the door of the refrigerator, or the amount of food stored in the refrigerator body and time left before the expiration of the quality guarantee period of the food in the refrigerator body may be learned remotely by using the remote client. When the amount of the stored food is inadequate or the quality guarantee period of the food is about to expire, the user may operate the touch display module locally to log onto a supermarket shopping network platform to place an order so as to supplement food, or the user may log onto the supermarket shopping network platform to place an order by using the remote client, so as to supplement food.

Figure 4:
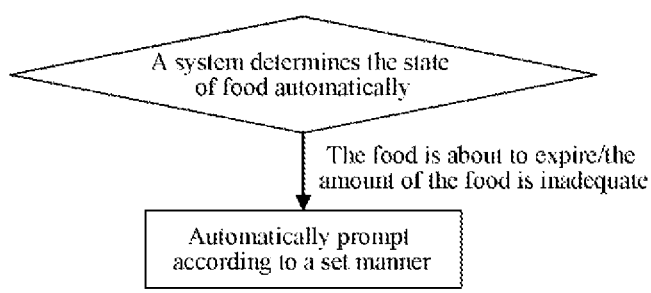
FIG. 4 is a work flow chart of food monitoring.

Referring to FIG. 4, the food monitoring unit is configured to provide an automatic prompt about the amount or a quality guarantee period of the virtual food put in the virtual food storage area, so as to avoid a technical deficiency that the refrigerator cannot provide a prompt in time due to a long period of a manual query.

Figure 6:
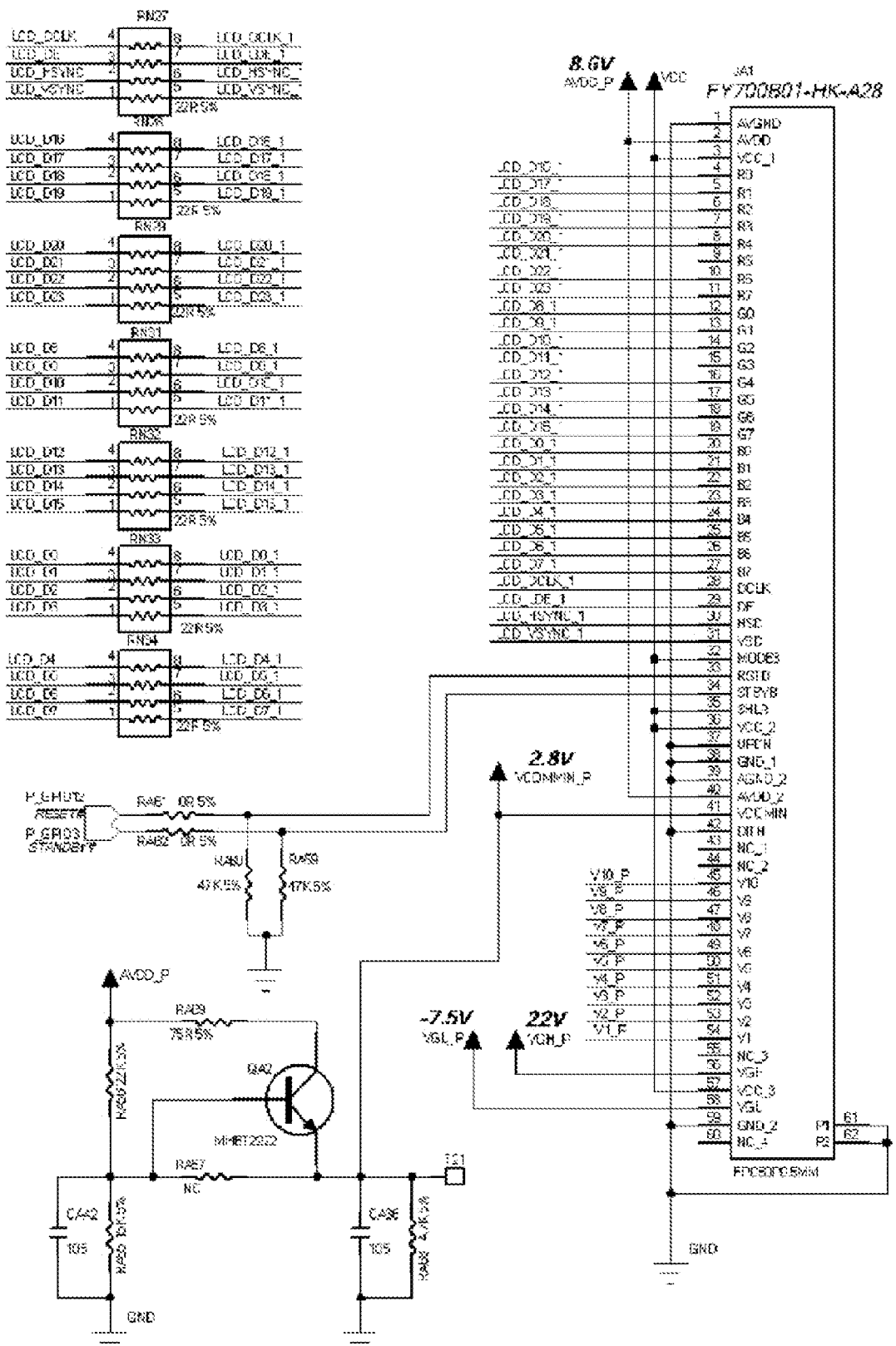
FIG. 6 is a schematic circuit diagram of a liquid crystal display (LCD) screen part of the present invention.
Figure 7:
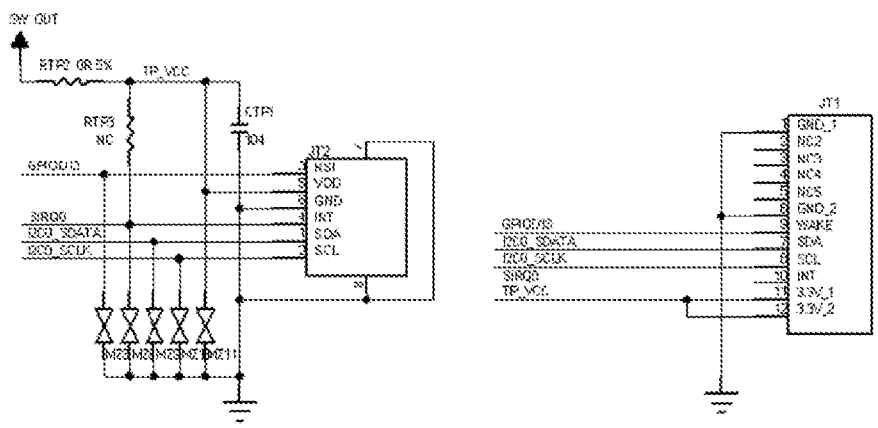
FIG. 7 is a schematic circuit diagram of a capacitive touch panel part of the present invention.

Referring FIG. 1, FIG. 6 and FIG. 7, the touch display module includes an LCD display screen TFT-LCM and a capacitive touch panel. This module is a main module for human-computer interaction. When placing food in the refrigerator body, a user can drag a food picture stored in a system to a corresponding location of a refrigerator picture by using the touch display module, and in this manner, the user can learn the corresponding location of the food inside the refrigerator visually by means of the display screen, which facilitates a subsequent query.

Figure 8:
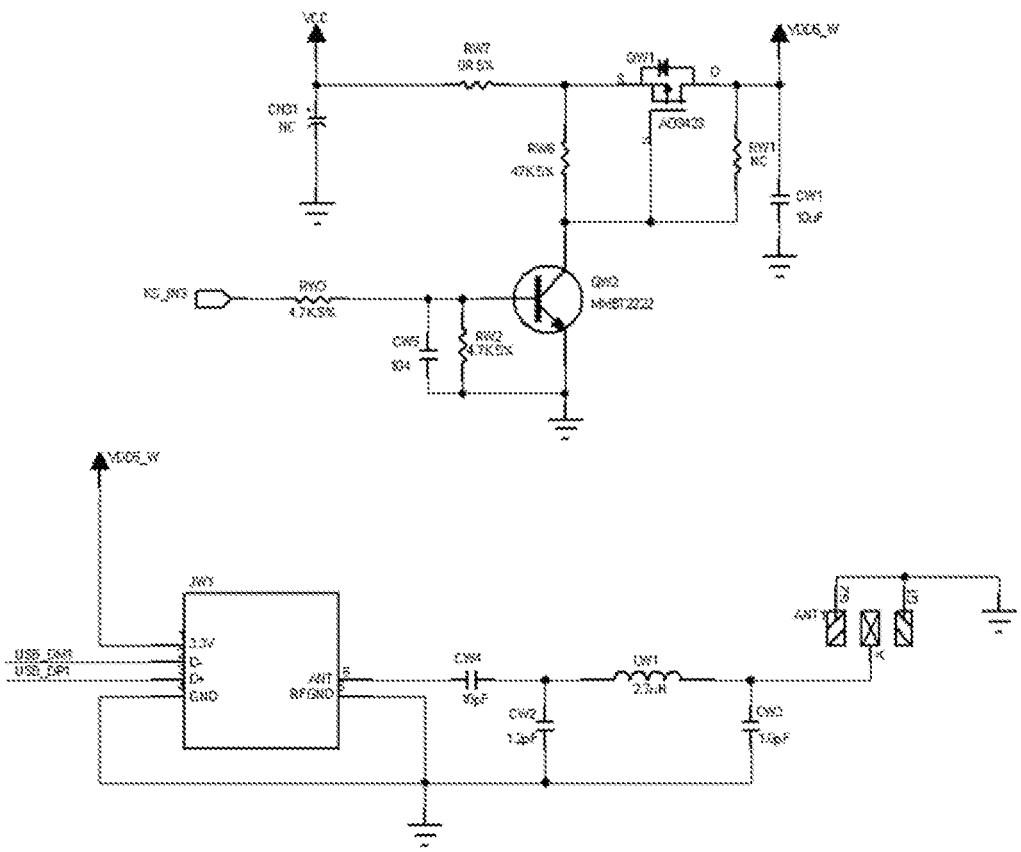
FIG. 8 is a schematic circuit diagram of a WIFI module part of the present invention.

Referring to FIG. 1 and FIG. 8, the network communications module is a WIFI module, an Ethernet module, or a GPRS communications module. A main advantage of the WIFI is that it is not limited by home network cabling and is very convenient and practical. By using the Internet, a user can access a supermarket, learn about the condition of the food in the refrigerator remotely, and access a remote server to enjoy more services.

The refrigerator control module is in communication connection with the main control chip of the central processing system module through the UART interface to implement control over basic functions of the refrigerator, and may also display a running state of the refrigerator in real time by using the LCD.

Referring to FIG. 1 and FIG. 3, apart from the aforementioned intelligent refrigerator, an application system which uses the intelligent refrigerator of the present invention further includes a remote client connected to the intelligent refrigerator through the Internet, and a supermarket shopping network platform for online shopping.

The intelligent refrigerator is configured to store food by freezing or cooling the food and log onto the supermarket shopping network platform by using a network communications module that connects to the supermarket shopping network platform so as to place an order to supplement food;

the remote client is a mobile phone, a computer, or a tablet computer; the remote client is connected to a central processing system module of the intelligent refrigerator through the Internet, queries the state and amount of the frozen and cooled food in the intelligent refrigerator, and logs onto the supermarket shopping network platform to place an order so as to supplement food; and the supermarket shopping network platform provides a purchase platform for the intelligent refrigerator or the remote client and provides purchase orders for businesses, so that supermarket staff provides a home delivery service.

The food management mode in the present invention implements functions of intelligent food management and remote food management. The most important feature is that the food management function is implemented in a most economical manner. This mode not only is applicable to developed regions, but also can implement the food management function in less developed regions. Anyone who buys an intelligent refrigerator can enjoy lots of convenience in life brought by the food management function. Information about the type and amount of food inside the refrigerator may be obtained by means of querying by using a display screen, and may also be obtained by means of querying by using a mobile phone or a network, and the refrigerator can further access a supermarket network through the Internet network, thereby implementing intelligent services of remote query and remote ordering. By using a remote server, a user can query information of all aspects from the server.

What is claimed is:

1. An intelligent refrigerator of food items comprising:
a refrigerator body;
a refrigerator control module that is disposed in the refrigerator body and configured to perform operational control on the refrigerator body;
wherein the refrigerator body further comprises a central processing system module, said central processing system is in connection to the Internet, and the refrigerator control module is in communication with the central processing system module through a universal asynchronous receiver/transmitter (UART) interface;
the central processing system module is further connected to a touch display module used for human-computer interaction and a network communications module used for connection to the Internet; and the central processing system module comprises:
a food storage management unit, said food storage management unit comprising virtual food storage areas corresponding to all food storage areas of the refrigerator body and a virtual food database;
wherein, when food is stored in the refrigerator body, corresponding virtual food in the virtual food database is manually moved to a corresponding virtual food storage area by using the touch display module; and
when stored food is taken out from the refrigerator body, corresponding virtual food is manually removed from a virtual food storage area by using the touch display module;
a query and order unit, configured to receive an operation instruction from the touch display module or a remote client;
said query and order unit receives query storage information about virtual food in the virtual food storage area, and determines, according to the storage information obtained by means of querying, whether it is necessary to log onto a supermarket shopping network platform to place an order so as to supplement food; and
a food monitoring unit, configured to provide an automatic prompt about the amount or a quality guarantee period of the virtual food put in the virtual food storage area.

2. The intelligent refrigerator of food items according to claim 1, wherein the central processing system module uses an ARM core processor and an ANDROID 4.0 operating system.

3. The intelligent refrigerator of food items according to claim 1, wherein the network communications module is a wireless fidelity (WIFI) module, an Ethernet module, or a global packet radio service (GPRS) communications module.

4. An intelligent refrigerator application system, comprising the intelligent refrigerator of food items according to claim 1, wherein
the remote client is connected to the intelligent refrigerator through the Internet, and to the supermarket shopping network platform for online shopping,
wherein the intelligent refrigerator is configured to store food items by freezing or cooling the food items and log on to the supermarket shopping network platform by using the network communications module that connects to the supermarket shopping network platform, so as to place an order to supplement food items;
the remote client is connected to the central processing system module of the intelligent refrigerator through the Internet, queries a state and an amount of the frozen and cooled food items in the intelligent refrigerator, and logs on to the supermarket shopping network platform to place an order so as to supplement food items; and
the supermarket shopping network platform provides a purchase platform for the intelligent refrigerator or the remote client and provides purchase orders for businesses.

5. The intelligent refrigerator application system according to claim 4, wherein the remote client is a mobile phone, a computer, or a tablet computer.

* * * * *